(12) United States Patent
Renson et al.

(10) Patent No.: US 12,043,060 B2
(45) Date of Patent: Jul. 23, 2024

(54) THREAD-TOGETHER WHEEL RIM

(71) Applicant: Hutchinson S.A., Paris (FR)

(72) Inventors: Christopher Renson, Langhorne, PA (US); Daniel Bruder, Mercerville, NJ (US); Michael G. Hartman, Lansdale, PA (US); Peter Hobe, Levittown, PA (US); Olivier Noblanc, Yardley, PA (US); Larry William Stuck, Amherst, NY (US)

(73) Assignee: Hutchinson S.A., Paris (FR)

( * ) Notice: Subject to any disclaimer, the term of this patent is extended or adjusted under 35 U.S.C. 154(b) by 929 days.

(21) Appl. No.: 17/066,760

(22) Filed: Oct. 9, 2020

(65) Prior Publication Data

US 2021/0107314 A1  Apr. 15, 2021

Related U.S. Application Data

(60) Provisional application No. 62/913,505, filed on Oct. 10, 2019.

(51) Int. Cl.
| | |
|---|---|
| *B60B 25/20* | (2006.01) |
| *B60B 25/00* | (2006.01) |
| *B60B 25/12* | (2006.01) |
| *B60B 25/22* | (2006.01) |
| *B60B 31/04* | (2006.01) |

(52) U.S. Cl.
CPC ............ *B60B 25/20* (2013.01); *B60B 25/004* (2013.01); *B60B 25/12* (2013.01); *B60B 25/22* (2013.01); *B60B 31/04* (2013.01); *B60B 2320/14* (2013.01)

(58) Field of Classification Search
CPC ..... B60B 25/002; B60B 25/004; B60B 25/04; B60B 25/08; B60B 25/10; B60B 25/12; B60B 25/14; B60B 25/20; B60B 31/04
See application file for complete search history.

(56) References Cited

U.S. PATENT DOCUMENTS

| | | | |
|---|---|---|---|
| 906,404 A | 12/1908 | Foucart | |
| 1,205,958 A * | 11/1916 | Allison | B60B 25/04 |
| | | | 301/35.1 |
| 1,345,522 A | 7/1920 | Walker | |
| 1,710,614 A * | 4/1929 | Furrer | B60B 25/08 |
| | | | 152/410 |
| 2,478,580 A * | 8/1949 | Hollerith | B60B 25/06 |
| | | | 152/406 |
| 2,496,256 A * | 2/1950 | Babin | B60B 25/16 |
| | | | 152/412 |
| 2,543,156 A | 2/1951 | Elias-Reyes | |
| 2,566,663 A | 9/1951 | Hollerith | |
| 4,363,347 A | 12/1982 | Baumgartner | |
| 4,770,220 A | 9/1988 | Mori | |

(Continued)

FOREIGN PATENT DOCUMENTS

GB    2354983 A    4/2001

OTHER PUBLICATIONS

International Search Report and Written Opinion issued in PCT/IB2020/059527 on Dec. 22, 2021.

*Primary Examiner* — Jason R Bellinger
(74) *Attorney, Agent, or Firm* — The Webb Law Firm

(57) ABSTRACT

A wheel rim for a vehicle including a first rim portion including a first wheel flange, a second rim portion threadedly connected to the first rim portion, and a second wheel flange held on the first rim portion.

26 Claims, 16 Drawing Sheets

(56) References Cited

U.S. PATENT DOCUMENTS

| | | |
|---|---|---|
| 7,258,403 B2 | 8/2007 | Rolla |
| 7,284,584 B2 | 10/2007 | Kimura |
| 2012/0104836 A1 | 5/2012 | Liao |
| 2014/0158265 A1 | 6/2014 | Slanker et al. |

* cited by examiner

THREAD-TOGETHER WHEEL RIM

CROSS REFERENCE TO RELATED APPLICATIONS

This applications claims the benefit of U.S. Patent Provisional Application No. 62/913,505, filed Oct. 10, 2019, the disclosure of which is incorporated in its entirety by reference.

BACKGROUND OF THE INVENTION

Field of the Invention

The present disclosure is generally directed to a wheel rim and, in particular, to a thread-together wheel rim assembly.

Description of Related Art

In certain ground vehicles, a plurality of wheel rims are provided to support pneumatic tires or pneumatic tires with a mobility device (e.g., run-flat) installed that assist in moving the ground vehicle along a ground surface. The pneumatic tires or pneumatic tires with a mobility device (e.g., run-flat) installed are mounted on an outer circumferential surface of the wheel rim. These wheel rims are used in a variety of different applications including military vehicles, forklifts, garbage trucks, large/heavy vehicles, and other industrial applications. A typical wheel rim geometry includes a mounting surface, an inner rim with a flange, and an outer rim with a flange. In some examples, the mounting surface, inner rim, and outer rim are formed as a monolithic structure. In other examples, to assist in mounting the pneumatic tire or run-flat on the wheel rim, the inner rim and the outer rim may be manufactured as two separate components that are connected to one another. In current wheel rim designs, there are multi-piece bolt-together designs where the inner rim and the outer rim are connected to one another using a plurality of fasteners that are inserted into a side surface of either the inner rim or the outer rim and multi-piece demountable wheel designs where a rim flange portion is held in place with a lock ring installed into a groove in a fixed rim portion In conventional wheel rims, a plurality of fasteners are typically used to operatively connect the inner rim to the outer rim to assemble the wheel rim. Due to needs in the industry, designs for reduced weight wheel rims are being developed. Current designs for reducing the weight of the wheel rim include reducing the number of fasteners but increasing the size of the remaining fasteners and/or reducing the number of fasteners and increase the strength of the remaining fasteners using a higher grade material. Both of these types of assemblies increase the costs for manufacturing the wheel rims.

SUMMARY OF THE INVENTION

In view of the foregoing wheel designs, there is a current need for a wheel rim that simplifies the assembly of the wheel rim. Further, there is a current need in the art for a wheel rim that is assembled using fewer or no fasteners or welding. In addition, there is a current need in the art for a wheel rim with a reduced weight compared to conventional wheel rims. In one example of the present disclosure, a wheel rim for a vehicle may include a first rim portion comprising a first wheel flange; a second rim portion threadedly connected to the first rim portion; and a second wheel flange held on the first rim portion.

In another example of the present disclosure, the first rim portion, the second rim portion, and the second wheel flange may be separate components. The first rim portion may include a threaded portion on an outer surface of the first rim portion. The second rim portion may include a threaded portion on an inner surface of the second rim portion. The second wheel flange may be held on the first rim portion via a sliding fit. The first rim portion and the second rim portion may each define a plurality of apertures configured to receive fasteners. A plurality of fasteners may be inserted in the plurality of apertures defined in the first rim portion and the second rim portion. The fasteners may assist in preventing rotation of the second rim portion relative to the first rim portion. The first rim portion and the second rim portion may be operatively connected to one another only via the threaded connection. A sealing element may be provided on the first rim portion to create a seal between the first rim portion and the second wheel flange. The second wheel flange may be held on the first rim portion between the first wheel flange and the threaded connection between the first rim portion and the second rim portion. The second rim portion may include a hard stop to limit rotation of the second rim portion relative to the first rim portion. At least one fastening member may be inserted through the second rim portion to contact an outer surface of the second wheel flange. An installation tool may be positioned within the first rim portion. A first gear arrangement may be defined on the second rim portion. A second gear arrangement may be defined on the installation tool. Rotation of the installation tool may cause the second gear arrangement to move the first gear arrangement to assist in rotating the second rim portion relative to the first rim portion. A key member may be removably inserted into a corresponding key opening defined in the first and second rim portions.

In another example of the present disclosure, a wheel rim assembly may include a pneumatic tire, and a wheel rim including a first rim portion including a first wheel flange, a second rim portion threadedly connected to the first rim portion, and a second wheel flange held on the first rim portion.

In another example of the present application, the first rim portion, the second rim portion, and the second wheel flange may be separate components. The first rim portion may include a threaded portion on an outer surface of the first rim portion. The second rim portion may include a threaded portion on an inner surface of the second rim portion. The second wheel flange may be held on the first rim portion via a sliding fit. The first rim portion and the second rim portion may each define a plurality of apertures configured to receive fasteners. A plurality of fasteners may be inserted in the plurality of apertures defined in the first rim portion and the second rim portion. The fasteners may assist in preventing rotation of the second rim portion relative to the first rim portion. The first rim portion and the second rim portion may be operatively connected to one another only via the threaded connection. A sealing element may be provided on the first rim portion to create a seal between the first rim portion and the second wheel flange. The second wheel flange may be held on the first rim portion between the first wheel flange and the threaded connection between the first rim portion and the second rim portion. The second rim portion may include a hard stop to limit rotation of the second rim portion relative to the first rim portion. At least one fastening member may be inserted through the second rim portion to contact an outer surface of the second wheel flange. An installation tool may be positioned within the first rim portion. A first gear arrangement may be defined on the second rim portion. A second gear arrangement may be defined on the installation tool. Rotation of the installation tool may cause the second gear arrangement to move the first gear arrangement to assist in rotating the second rim portion relative to the first rim portion. A key member may be removably inserted into a corresponding key opening defined in the first and second rim portions.

In another example of the present application, a method of assembling a wheel rim assembly, may include providing a first rim portion comprising a first wheel flange; sliding a second wheel flange onto the first rim portion; and operatively connecting a second rim portion onto the first rim portion via a threaded connection. The method may further include inserting fasteners into the first rim portion through the second rim portion to prevent rotation of the second rim portion relative to the first rim portion.

DESCRIPTION OF THE INVENTION

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present disclosure is directed to, in general, a wheel assembly and, in particular, to a multipiece wheel rim assembly. Certain preferred and non-limiting aspects of the components of the wheel rim are illustrated in FIGS. 1 and 2.

Figure 1:
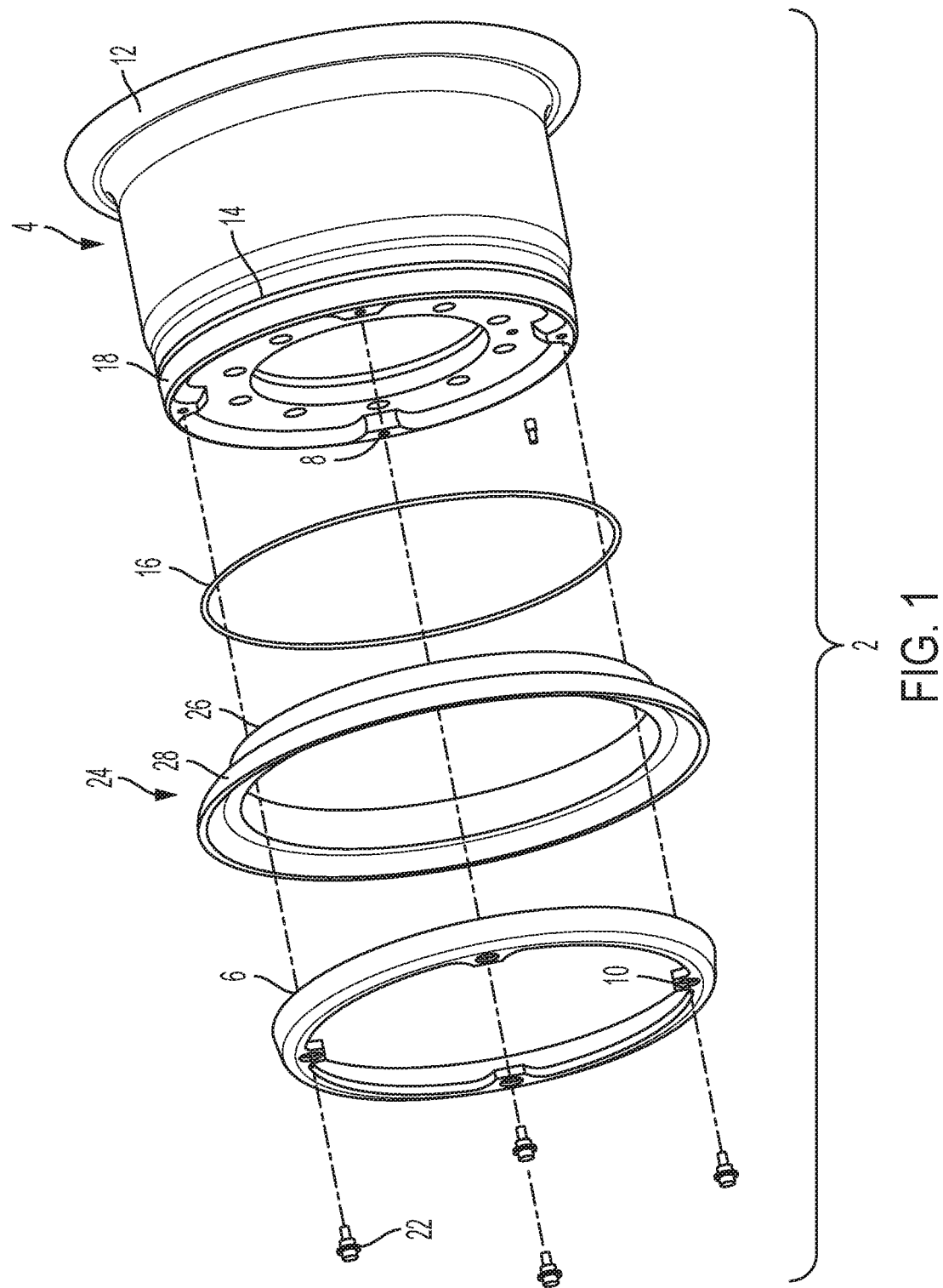
FIG. 1 is an assembly view of a wheel rim according to one example of the present disclosure.
Figure 2:
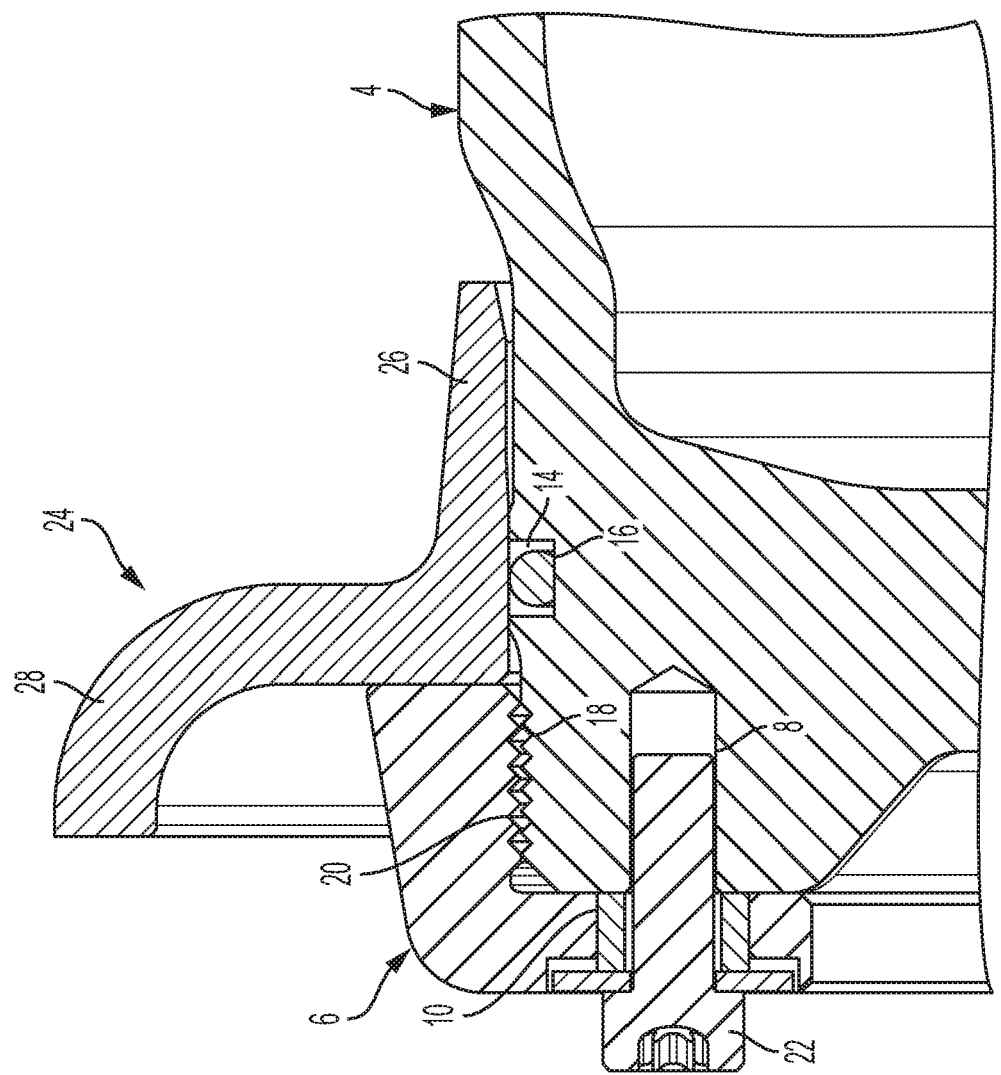
FIG. 2 is a cross-sectional view of the wheel rim of FIG. 1.

With reference to FIGS. 1 and 2, a first example of a wheel rim 2 according to the present disclosure is shown and described. The wheel rim 2 includes an inner rim 4 and an outer rim 6 that are operatively connected to one another. The inner rim 4 and the outer rim 6 may be fabricated components made using a mold, using a die, using a tool, being machined, through additive manufacturing, being joined together from multiple pieces, or a combination thereof. In one example, the rims 4, 6 are substantially circular in shape. A set of apertures 8, 10 are defined in a circumferential pattern around an outer edge portion of each rim 4, 6. It is to be understood that, although the wheel rim 2 is described as including two rim portions 4, 6, it is also contemplated that the wheel rim 2 may include more than two rim portions.

As shown in FIG. 1, the inner rim 4 may include a wheel flange 12 that extends from one circumferential end of the inner rim 4. In one example, the wheel flange 12 has a greater diameter than the main body of the inner rim 4. An end of the inner rim 4 opposing the wheel flange 12 may define a channel 14 to receive a sealing element 16. In one example, the sealing element 16 may be an elastomeric O-ring. In another example, the channel 14 and sealing element may be provided on the outer rim 6.

As shown in FIG. 2, the inner rim 4 and the outer rim 6 may be operatively connected together using a threaded connection. In one example, a circumferential portion 18 of the inner rim 4 may include a threaded connection, and a corresponding circumferential portion 20 of the outer rim 16 may include a threaded connection, such that the inner rim 4 and the outer rim 6 may be operatively connected by threading the inner rim 4 and the outer rim 6 together. In one example, the circumferential portion 18 of the inner rim 4 may be provided on an outer surface of the inner rim 4. In one example, the circumferential portion 20 of the outer rim 6 may be provided on an inner surface of the outer rim 6. Using this threaded connection, the wheel rim 2 may be assembled by threading the inner rim 4 and the outer rim 6 together to create a secure connection between the inner rim 4 and the outer rim 6. The threaded connection between the inner rim 4 and the outer rim 6 provides a clamping force needed to hold the inner rim 4 and the outer rim 6 together, while resisting a side force generated by an air pressure in the tire and/or run-flat held on the wheel rim 2.

In another example of the present disclosure, at least one fastener 22 may be provided on the wheel rim 2 to prevent rotation of the outer rim 6 relative to the inner rim 4 after the inner rim 4 and the outer rim 6 have been secured to one another. The fasteners 22 may be inserted through the apertures 10 defined in the outer rim 6 and into the apertures 8 defined in the inner rim 4. In one example of the present disclosure, the fasteners 22 are bolts with washers. It is also to be understood that the fasteners 22 may be a lock plate (used on three-piece steel demountable wheels), a dowel pin, a cotter pin, a safety wire, or any other suitable anti-rotation fastener. In one example, four fasteners 22 are provided on the wheel rim 2. As shown in FIG. 1, the fasteners 22 are received in the apertures 8 defined in the inner rim 4. Therefore, after the inner rim 4 and the outer rim 6 have been threaded together, the fasteners 22 may be inserted into the inner rim 4 such that the outer rim 6 is prevented from rotating relative to the inner rim 4 and eliminates the risk that the outer rim 6 will unthread from the inner rim 4 and separate the outer rim 6 from the inner rim 4. In one example of the present disclosure, the fasteners 22 are operatively connected to the inner rim 4 to prevent rotation of the outer rim 6, but do not compress the outer rim 6 against the inner rim 4, thereby preventing deformation of the threaded connection between the inner rim 4 and the outer rim 6. While the fasteners 22 assist in preventing the outer rim 6 from separating from the inner rim 4, it is to be understood that a secure connection between the inner rim 4 and the outer rim 6 is achieved via the threaded connection and without the use of the fasteners 22.

With reference to FIG. 1, the wheel rim 2 may also include a separate wheel flange 24 that is assembled on the inner rim 4. The wheel flange 24 may be circular in shape and may have an inner diameter that slightly smaller than an outer diameter of the main body of the inner rim 4. With reference to FIG. 2, in one example of the present disclosure, the wheel flange 24 may be held on the inner rim 4 via a sliding fit. The sealing element 16 may create a seal with the wheel flange 24 when assembled on the inner rim 4. In one example, the wheel flange 24 includes a body portion 26 and an outer flange 28 that extends from the body portion 26. The outer diameter of the outer flange 28 may correspond to the outer diameter of the wheel flange 12 on the inner rim 4 such that a tire or run-flat (not shown) can be held on the wheel rim 2 between the wheel flange 12 and the outer flange 28.

With reference to FIGS. 1 and 2, a method of assembly for the wheel rim 2 is shown and described. After the components of the wheel rim 2 have been manufactured, the scaling element 16 is inserted into the channel 14 defined on the inner rim 4. Once the scaling element 16 has been positioned on the inner rim 4, the wheel flange 24 is pushed onto the inner rim 4. In one example, the wheel flange 24 is pushed onto an end of the inner rim 4 opposite the wheel flange 12 and is held on the inner rim 4 via a sliding fit. Once the wheel flange 24 is held on the inner rim 4, the outer rim 6 is threaded onto the inner rim 4 to secure the outer rim 6 to the inner rim 4. The outer rim 6 also assists in retaining the wheel flange 24 on the wheel rim 2. In an optional step, after the outer rim 6 is threaded onto the inner rim 4, the fasteners 22 may be inserted through the outer rim 6 and into the inner rim 4 to prevent rotation of the outer rim 6 relative to the inner rim 4. In one example of the present disclosure, the assembly of the wheel rim 2 must be conducted using a press, such that the wheel rim 2 cannot be manually assembled.

By assembling the wheel rim 2 using a threaded connection and not a fastener connection, the wheel rim 2 of the present disclosure experiences reduction in weight compared to conventional wheel rims that connected the inner rim and the outer rim using a plurality of fasteners. For example, the reduction in weight compared to conventional wheel rims may be at least 10%, however, this is not to be construed as limiting the present disclosure as the reduction in weight may be much greater than 10%. Furthermore, by eliminating the need to use fasteners to operatively connect the inner rim and the outer rim, the number of components of the wheel rim 2 is reduced, the assembly time for the wheel rim 2 is significantly reduced, hardware installation failures are reduced, and ergonomic issues are improved. In addition, by providing the threaded connection between the inner rim 4 and the outer rim 6, the remaining fasteners 22 can be reduced in size since they no longer bear the load of the wheel joint. The safety factor of the wheel rim 2 is also increased relative to conventional wheel rims due to the threaded connection. The wheel rim 2 further includes an integral deflation safety system since, with removal of one of the fasteners 22, a tire on the wheel rim 2 can automatically deflate, rendering the wheel rim 2 safe for disassembly. The threaded connection in the wheel rim 2 also allows for no limitation on the wheel rim geometry. The modular design of the wheel rim 2 also allows for communization of the parts of the wheel rim 2. In another example of the present disclosure, the design of the wheel rim 2 allows for the rim width to be altered using adjustment of the threaded connection.

Figure 3:
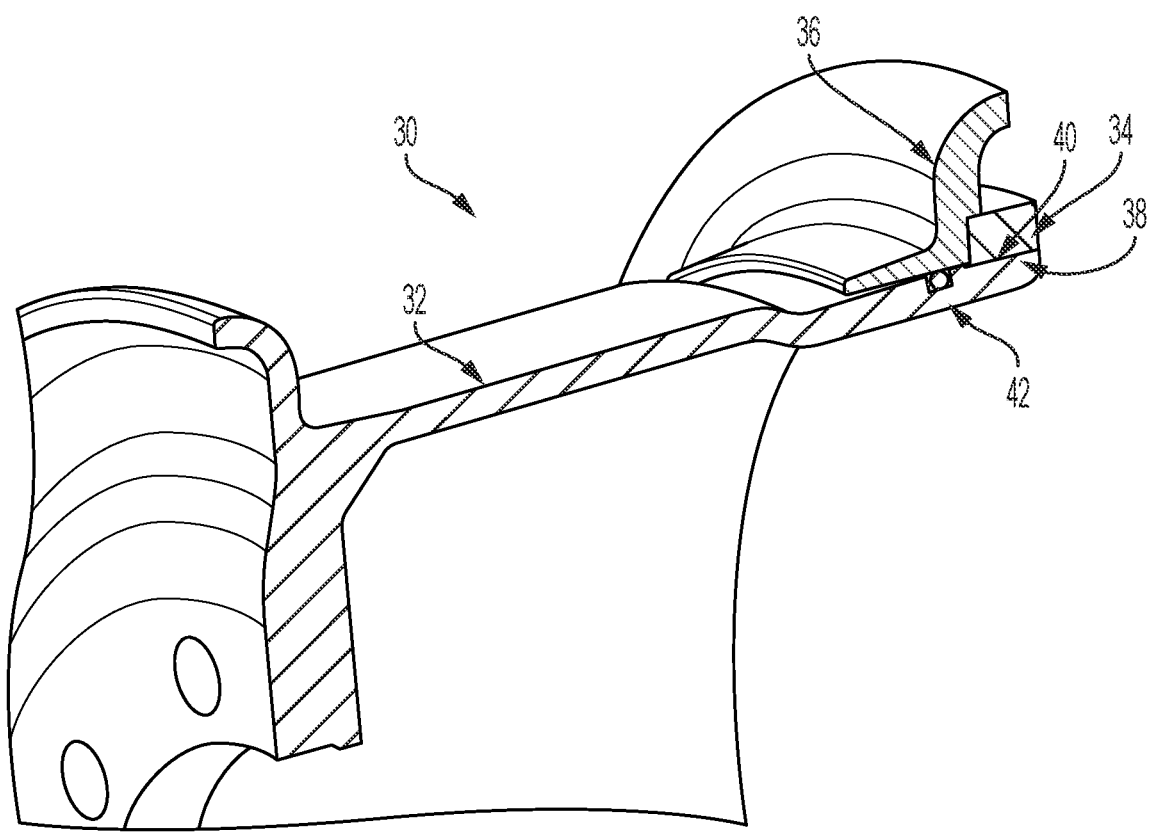
FIG. 3 is a cross-sectional view of a wheel rim according to one example of the present disclosure.

With reference to FIG. 3, another example of a wheel rim 30 according to the present disclosure is shown and described. This example of the wheel rim 30 is similar to the wheel rim 2 described above. However, this wheel rim 30 includes a threaded connection on an inner portion of the wheel rim 30. For example, the wheel rim 30 may include an outer rim 32, an inner rim 34, and a wheel flange 36. In this example of the present disclosure, the outer rim 32 includes a threaded portion 38 on an inner portion thereof, and the inner rim 34 includes a corresponding threaded portion 40. Therefore, in this example of the wheel rim 30, the threaded connection between the outer rim 32 and the inner rim 34 is on an inner portion of the wheel rim 30. By using this connection arrangement, this allows the threaded connection to be positioned on an inner side of the vehicle, thereby preventing disconnection of the outer rim 32 and the inner rim 34 unless the wheel rim 2 is removed from the vehicle. The wheel rim 30 may also include a scaling member 42 that is received in a channel defined in the outer rim 32. The sealing member 42 may create a seal between the outer rim 32 and the wheel flange 36.

Figure 4:
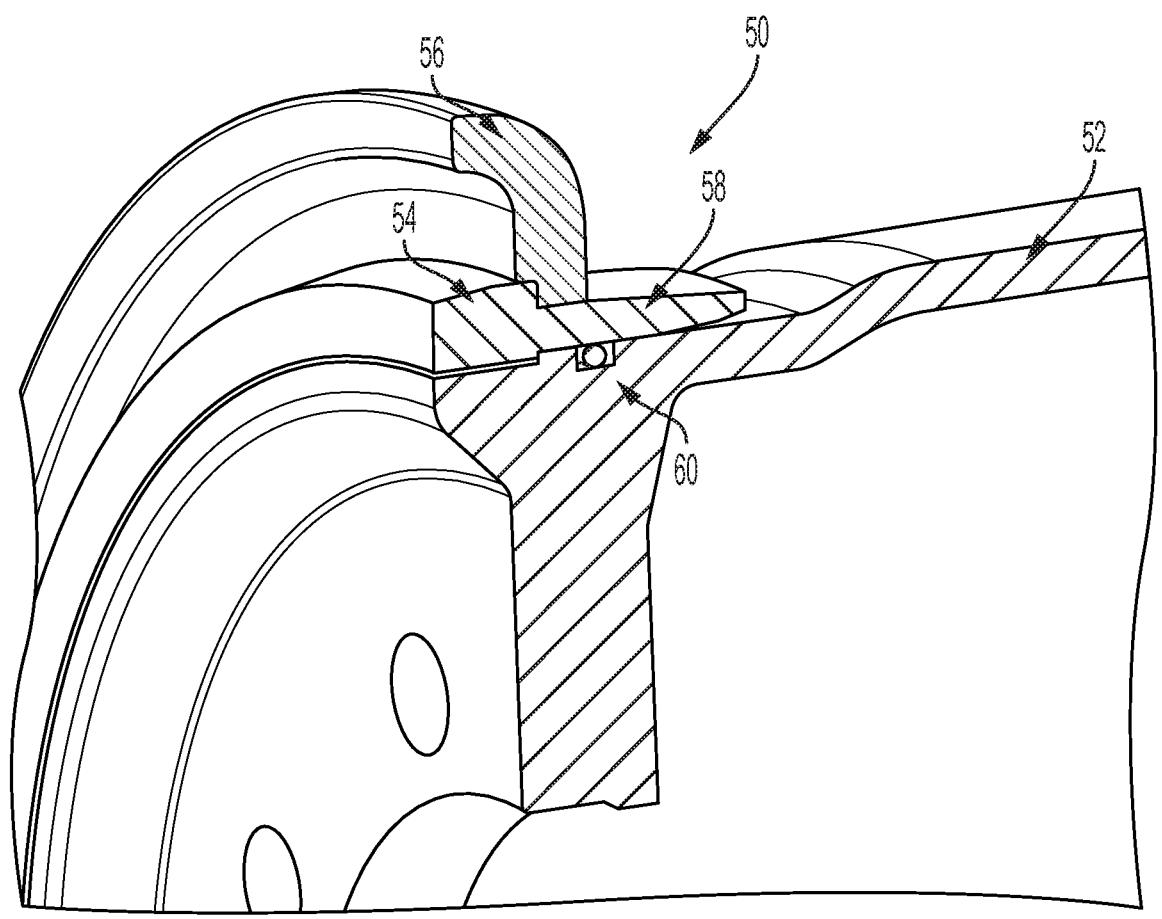
FIG. 4 is a cross-sectional view of a wheel rim according to one example of the present disclosure.

With reference to FIG. 4, another example of a wheel rim 50 according to the present disclosure is shown and described. This example of the wheel rim 50 is similar to the wheel rim 2 described above. The wheel rim 50 may include an inner rim 52, an outer rim 54, and a wheel flange 56. The inner rim 52 and the outer rim 54 may be threadedly connected to one another as described above. In this example of the wheel rim 50, the outer rim 54 includes an extension member 58 that acts as a bead seat or sealing surface between the scaling member 60 held in the inner rim 52 and the outer rim 54. Therefore, the bead seat is integrated into the outer rim 54, instead of the wheel flange 56, as is done with the wheel rim 2.

Figure 5:
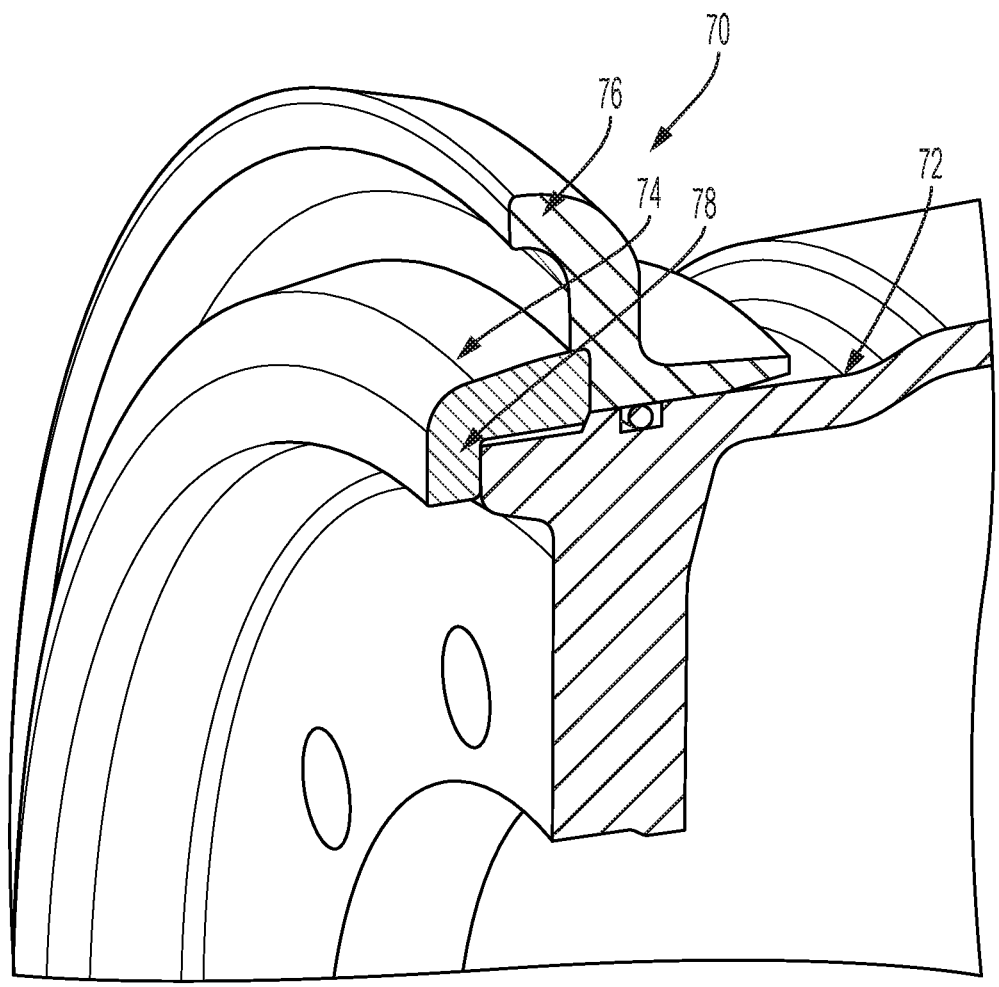
FIG. 5 is a cross-sectional view of a wheel rim according to one example of the present disclosure.

With reference to FIG. 5, another example of a wheel rim 70 according to the present disclosure is shown and described. This example of the wheel rim 70 is similar to the wheel rim 2 described above. The wheel rim 70 may include an inner rim 72, an outer rim 74, and a wheel flange 76. The inner rim 72 and the outer rim 74 may be threadedly connected to one another as described above. In this example of the wheel rim 70, the outer rim 74 includes an extension member 78 that acts as a hard stop that contacts a portion of the inner rim 72 during assembly of the wheel rim 70. The extension member 78 may extend downwardly from an outer portion of the outer rim 74. The extension member 78 is configured to act as a hard stop that prevents over rotation of the outer rim 74 when being threaded onto the inner rim 72. As the outer rim 74 is threaded onto the inner rim 72, the extension member 78 will eventually contact a portion of the inner rim 72, thereby preventing further rotation of the outer rim 74 on the inner rim 72. By preventing further rotation of the outer rim 74, the outer rim 74 is not over-threaded such that the wheel flange 76 is not moved too far inwardly on the inner rim 72, which could result in over-compressing the run-flat or wheel on the wheel rim 70. The extension member 78 may also act as a hard stop that ensures the wheel flange 76 is positioned at the same position each time the outer rim 74 is threaded to the inner rim 72.

Figure 6:
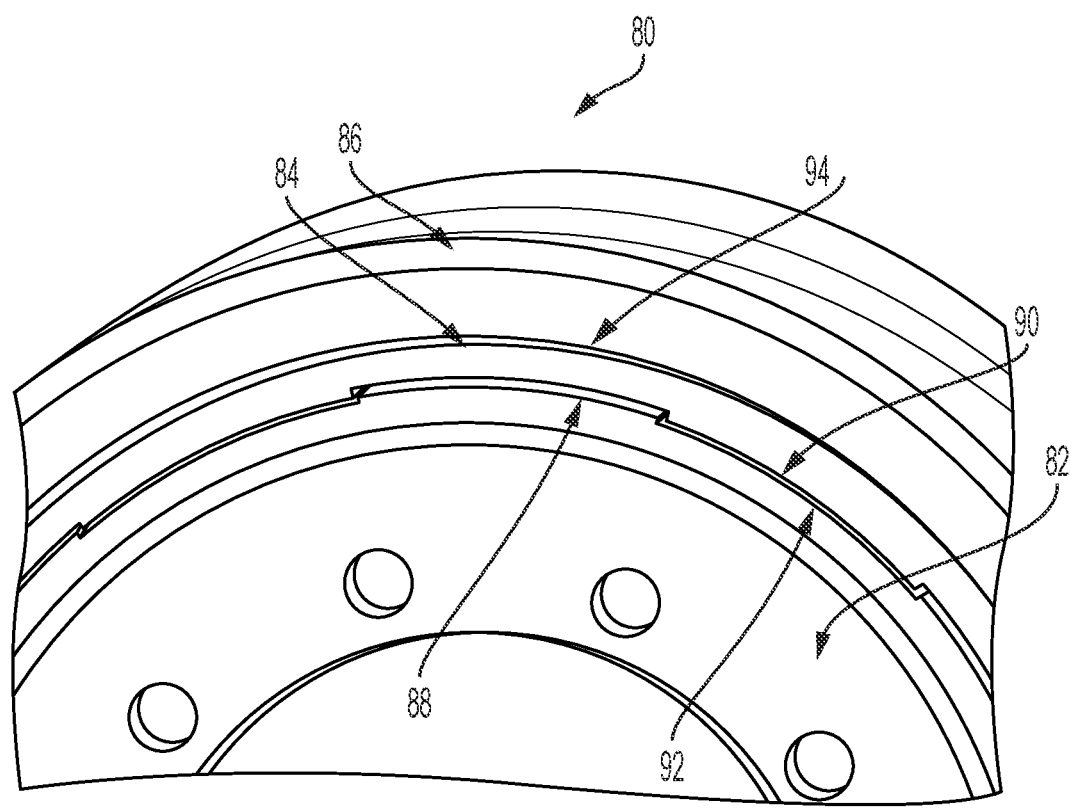
FIG. 6 is a side view of a wheel rim according to one example of the present disclosure.

With reference to FIG. 6, another example of a wheel rim 80 according to the present disclosure is shown and described. The wheel rim 80 may include an inner rim 82, an outer rim 84, and a wheel flange 86. The inner rim 82 and the outer rim 84 may be threadedly connected to one another as described above. In this example of the wheel rim 80, discontinuous or interrupted threads 88, 90 are provided on the inner rim 82 and the outer rim 84, respectively, to reduce the number of threads on the inner and outer rims 82, 84 to reduce the number of turns needed to tighten the outer rim 84 on the inner rim 82. As shown in FIG. 6, gaps 92, 94 are defined in the inner rim 82 and the outer rim 84, respectively, which allows the outer rim 84 to be positioned on the inner rim 82 before the outer rim 84 is threaded on the inner rim 82.

Figure 7:
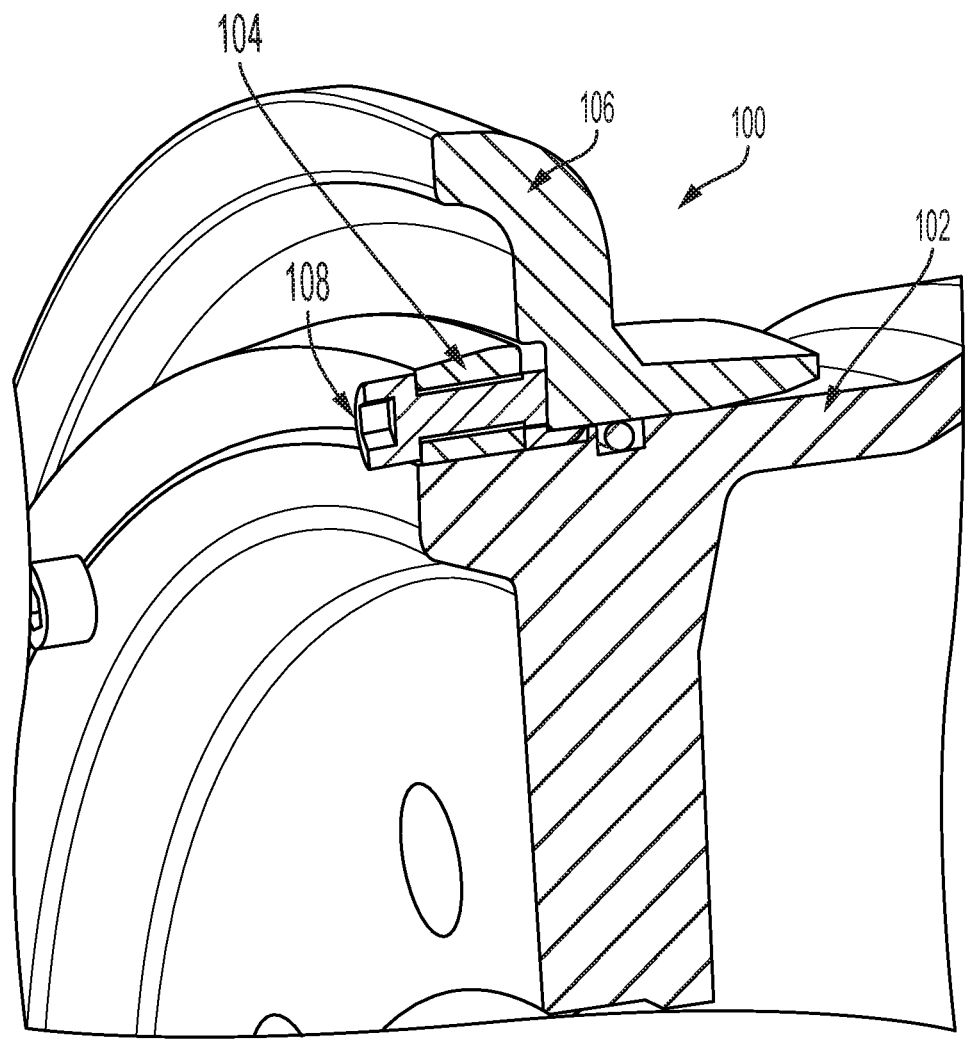
FIG. 7 is a cross-sectional view of a wheel rim according to one example of the present disclosure.

With reference to FIG. 7, another example of a wheel rim 100 according to the present disclosure is shown and described. The wheel rim 100 may include an inner rim 102, an outer rim 104, and a wheel flange 106. The inner rim 102 and the outer rim 104 may be threadedly connected to one another as described above. In this example of the wheel rim 100, at least one fastening member 108 that is inserted into the outer rim 104 to assist in retaining the wheel flange 106 on the inner rim 102. The fastening member 108 may be a bolt. In one example, a plurality of fastening members 108 are provided on the outer rim 104. The fastening member 108 may be threaded into an aperture defined in the outer rim 104. As shown in FIG. 7, the fastening member 108 has a length that extends through the aperture in the outer rim 104 to contact an outer surface of the wheel flange 106. After the outer rim 104 has been threaded onto the inner rim 106, the fastening member 108 may be threaded into the aperture of the outer rim 104 until the fastening member 108 comes into contact with the wheel flange 106. The fastening member 108 may be tightened to compress the wheel flange 106 into a final position on the wheel rim 100. By providing the fastening member 108, it no longer becomes necessary to use special installation tools to ensure the wheel flange 106 is provided at the correct final position on the wheel rim 100. During disassembly of the wheel rim 100, the fastening members 108 may be loosened, which eliminates any loading on the outer rim 104, allowing the outer rim 104 to be easily unthreaded from the inner rim 102.

Figure 8:
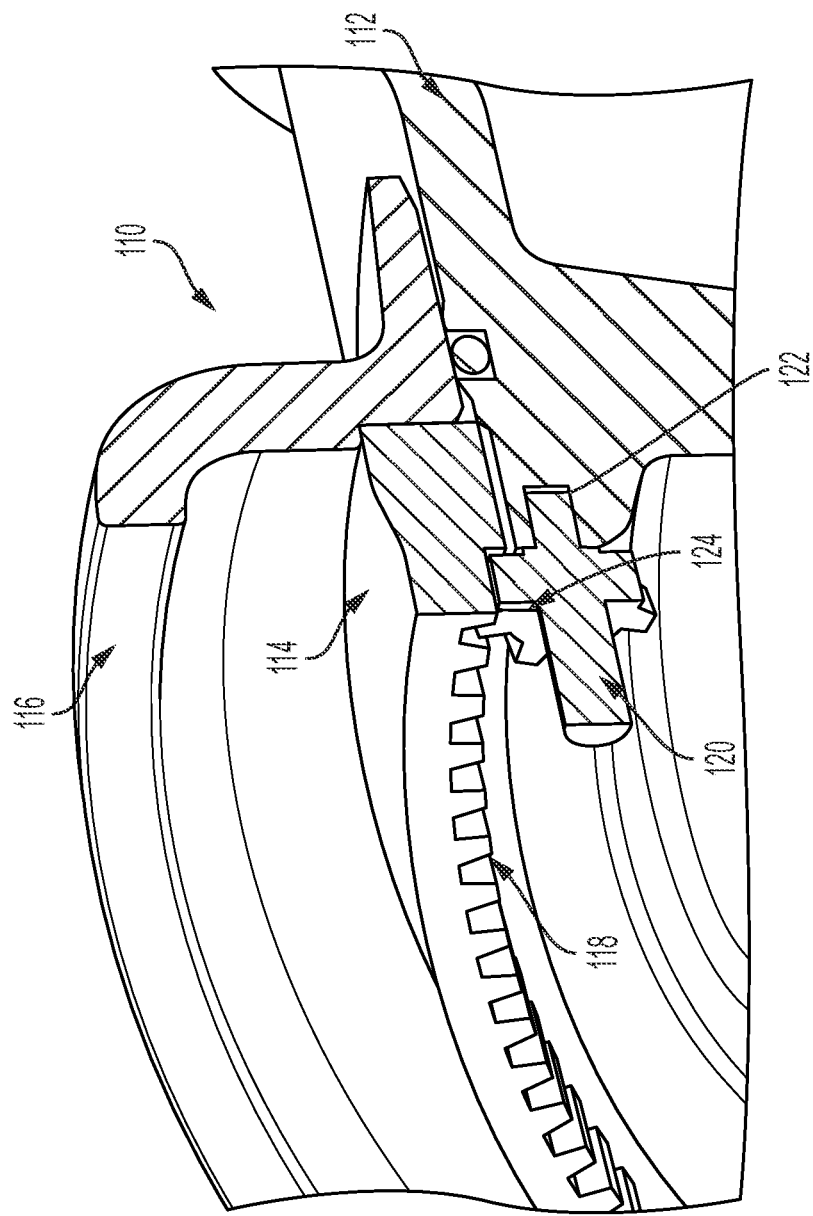
FIG. 8 is a cross-sectional view of a wheel rim according to one example of the present disclosure.

With reference to FIG. 8, another example of a wheel rim 110 according to the present disclosure is shown and described. The wheel rim 110 may include an inner rim 112, an outer rim 114, and a wheel flange 116. The inner rim 112 and the outer rim 114 may be threadedly connected to one another as described above. In this example of the wheel rim 110, the outer rim 114 is provided with a gear arrangement 118 on an inner surface thereof to assist a user in threading the outer rim 114 on the inner rim 112. The gear arrangement 118 extends around an entire inner circumferential surface of the outer rim 114. An installation tool 120 may also be provided with the wheel rim 110 to work in conjunction with the gear arrangement 118 to assist in threading the outer rim 114 on the inner rim 112. The installation tool 120 may be removably inserted into or integrally formed with an aperture 122 defined in the inner rim 112. The installation tool 120 may be rotatable within the aperture 122. The installation tool 120 may include a gear arrangement 124 that is configured to engage the gear arrangement 118 on the outer rim 114. When the gear arrangements 118, 124 are engaged with one another, the installation tool 120 may be rotated such that the gear arrangement 124 of the installation tool 120 causes the gear arrangement 118 of the outer rim 114 to rotate, thereby causing the outer rim 114 to rotate on the inner rim 112.

Figure 9:
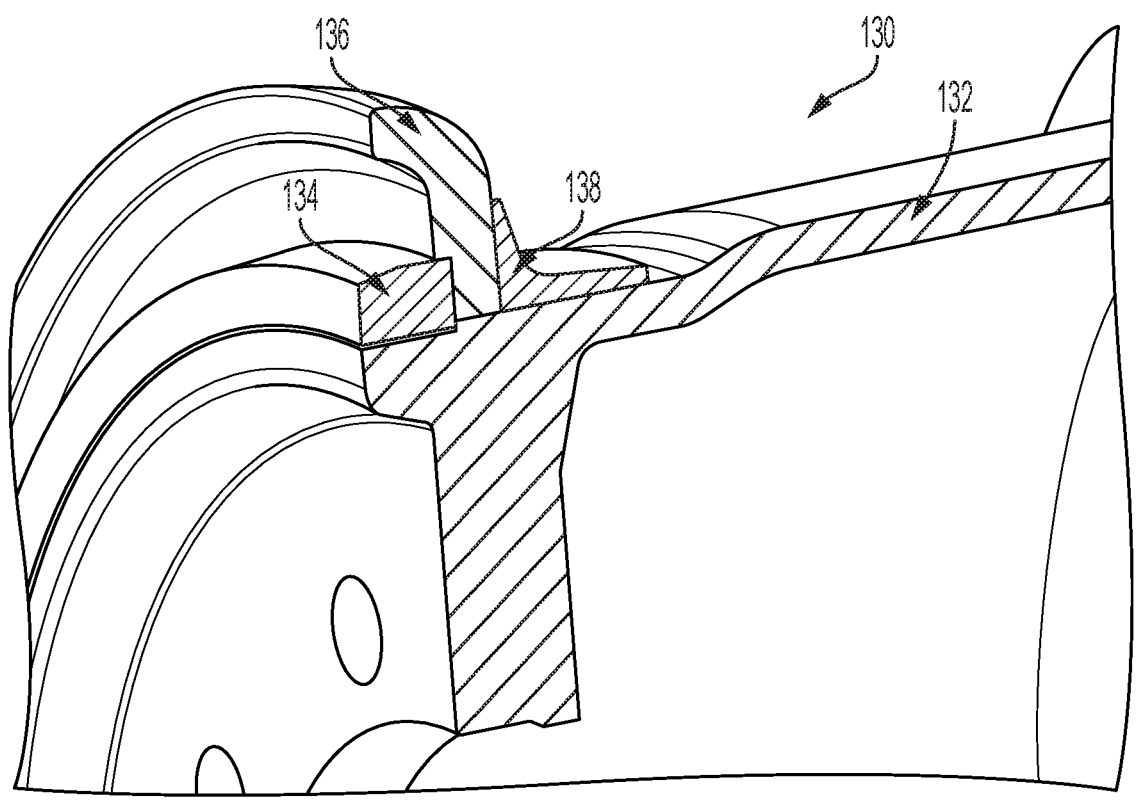
FIG. 9 is a cross-sectional view of a wheel rim according to one example of the present disclosure.

With reference to FIG. 9, another example of a wheel rim 130 according to the present disclosure is shown and described. The wheel rim 130 may include an inner rim 132, an outer rim 134, and a wheel flange 136. The inner rim 132 and the outer rim 134 may be threadedly connected to one another as described above. In this example of the wheel rim 130, instead of a scaling member that is provided in a channel defined in the inner rim 132, a scaling member 138 is provided on an inner surface of the wheel flange 136 to create a seal between the inner surface of the wheel flange 136 and an outer surface of the inner rim 132. In one example, the scaling member 138 may be an L-seal. By way of example of this wheel rim 130, it is to be understood that the tire cavity of the wheel rim 130 can be sealed using multiple different methods.

Figure 10:
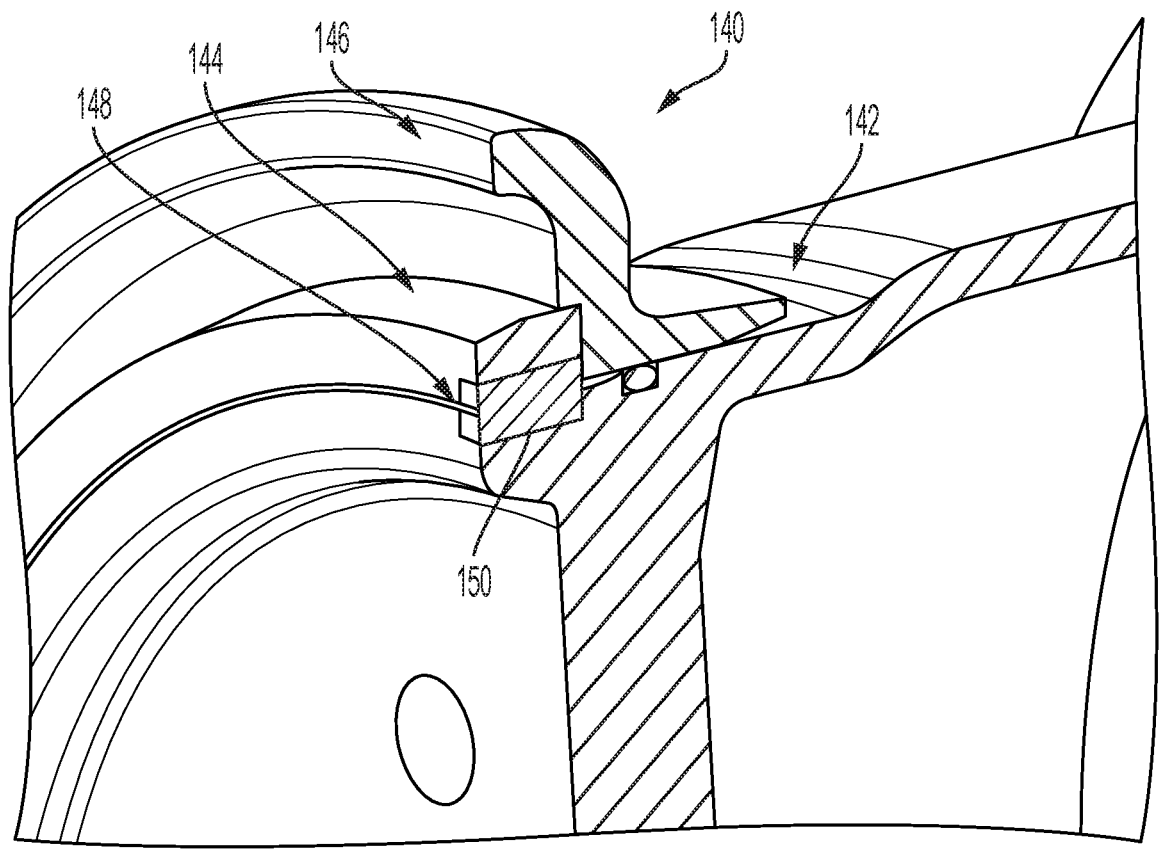
FIG. 10 is a cross-sectional view of a wheel rim according to one example of the present disclosure.

With reference to FIG. 10, another example of a wheel rim 140 according to the present disclosure is shown and described. The wheel rim 140 may include an inner rim 142, an outer rim 144, and a wheel flange 146. The inner rim 142 and the outer rim 144 may be threadedly connected to one another as described above. In this example of the wheel rim 140, a key member 148 may be inserted into a portion of the inner rim 142 and the outer rim 144 to prevent rotation of the outer rim 144 relative to the inner rim 142. The portions of the inner rim 142 and the outer rim 144 may define a corresponding opening 150 that defines a shape corresponding to the shape of the key member 148. After the outer rim 144 has been threaded on the inner rim 142, the key member 148 may be inserted into the opening 150 to ensure that the outer rim 144 cannot rotate relative to the inner rim 142 and de-thread from the inner rim 142.

Figure 11:
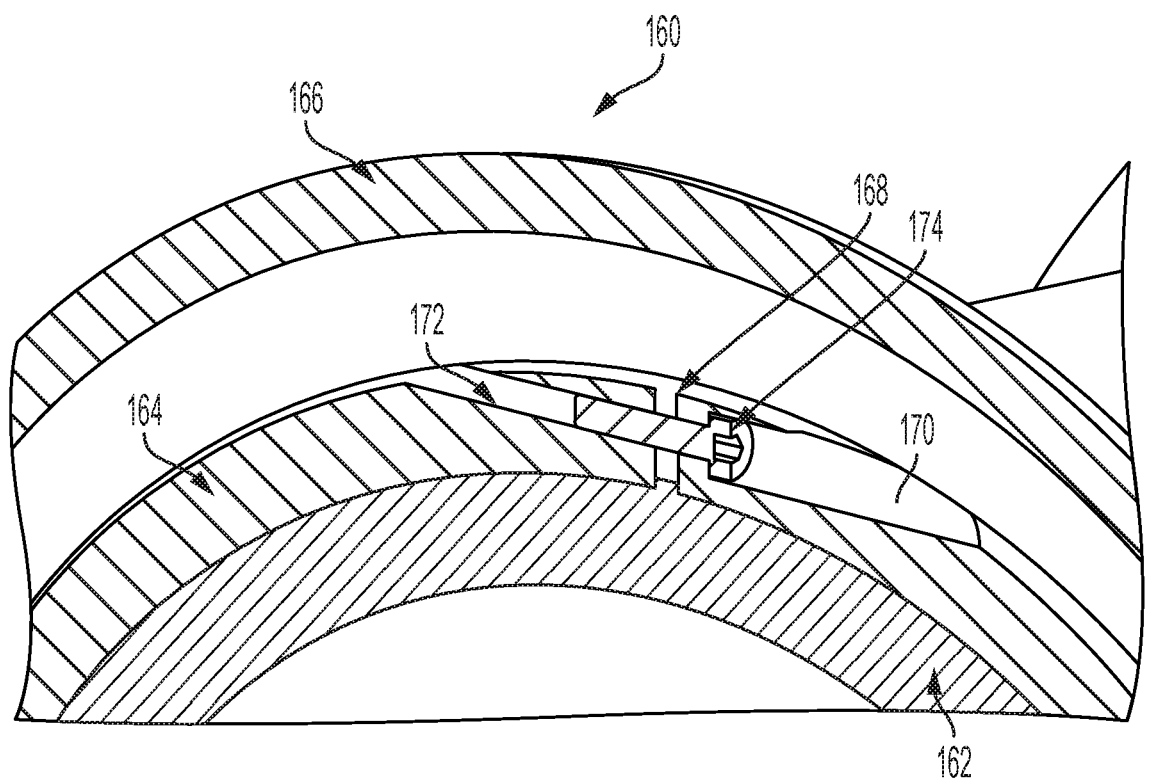
FIG. 11 is a cross-sectional view of a wheel rim according to one example of the present disclosure.

With reference to FIG. 11, another example of a wheel rim 160 according to the present disclosure is shown and described. The wheel rim 160 may include an inner rim 162, an outer rim 164, and a wheel flange 166. The inner rim 162 and the outer rim 164 may be threadedly connected to one another as described above. In this example of the wheel rim 160, the outer rim 164 may define a split line 168 therein. As shown in FIG. 11, adjacent the split line 168, two threaded apertures 170, 172 are defined in each end of the outer rim 164. The apertures 170, 172 are configured to receive a fastening member 174. After the outer rim 164 has been threaded on the inner rim 162, the fastening member 174 can be fastened to close the gap defined by the split line 168 to brings the ends of the outer rim 164 towards one another. As the fastening member 174 tightens the outer rim 164, the thread diameter of the threaded portion of the outer rim 164 is increased and the inner diameter of the outer rim 164 is decreased such that an interference fit is created between the threads of the outer rim 164 and the threads of the inner rim 162 to create a stronger threaded connection between the inner rim 162 and the outer rim 164. As the fastening member 174 is rotated in an opposite direction to loosen the outer rim 164, the thread diameter of the threaded portion of the outer rim 164 is reduced and the inner diameter of the outer rim 164 is increased such that it is easier to remove the outer rim 164 from the inner rim 162.

Figure 12:
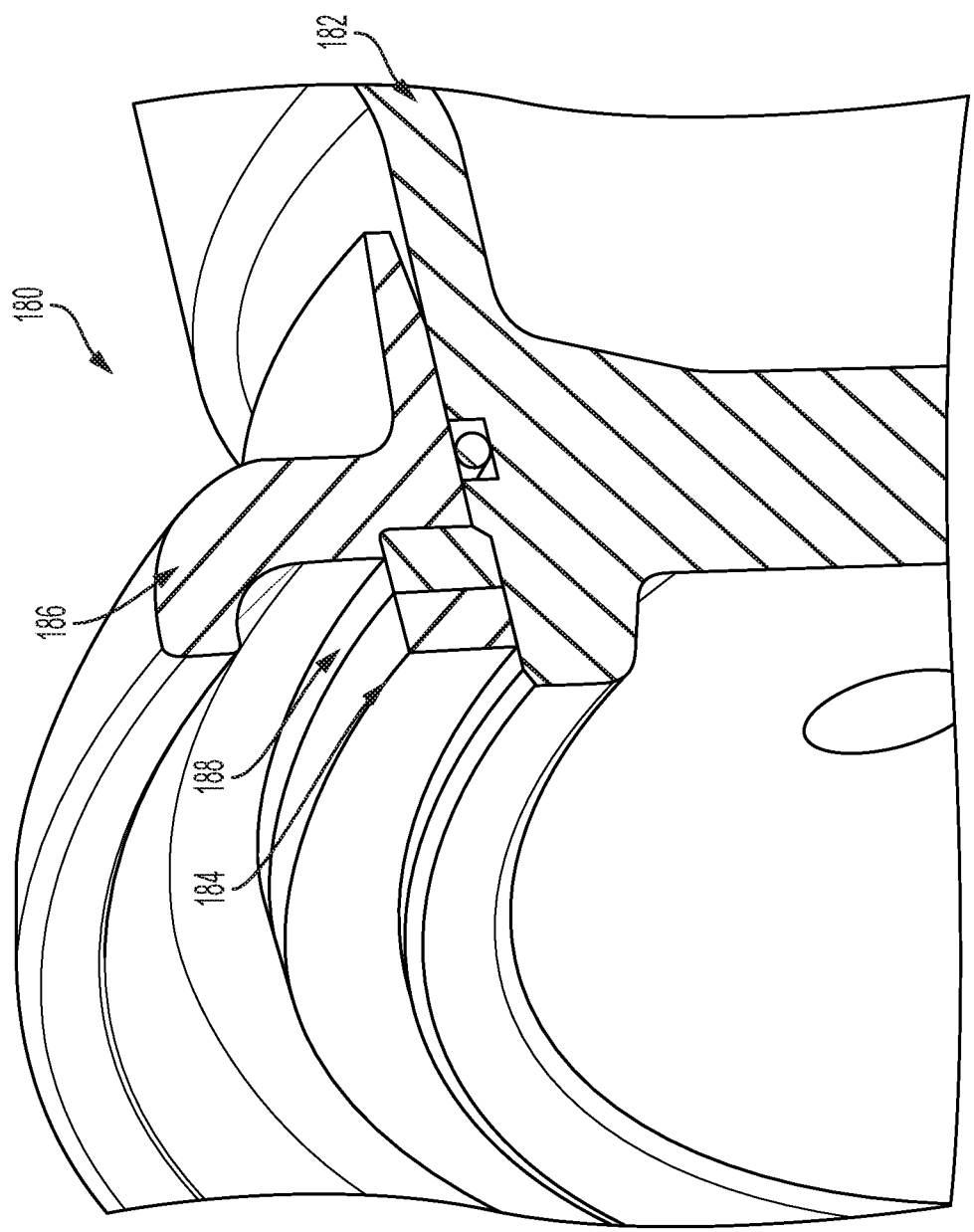
FIG. 12 is a cross-sectional view of a wheel rim according to one example of the present disclosure.

With reference to FIG. 12, another example of a wheel rim 180 according to the present disclosure is shown and described. The wheel rim 180 may include an inner rim 182, an outer rim 184, and a wheel flange 186. The inner rim 182 and the outer rim 184 may be threadedly connected to one another as described above. In this example of the wheel rim 180, an additional outer rim 188 is threaded on the inner rim 182. The additional outer rim 188 may create an interference with the outer rim 184 to prevent rotation of the outer rim 184 after assembly of the wheel rim 180. In one example, the two outer rims 184, 188 act as "jam nuts" on the inner rim 182.

Figure 13:
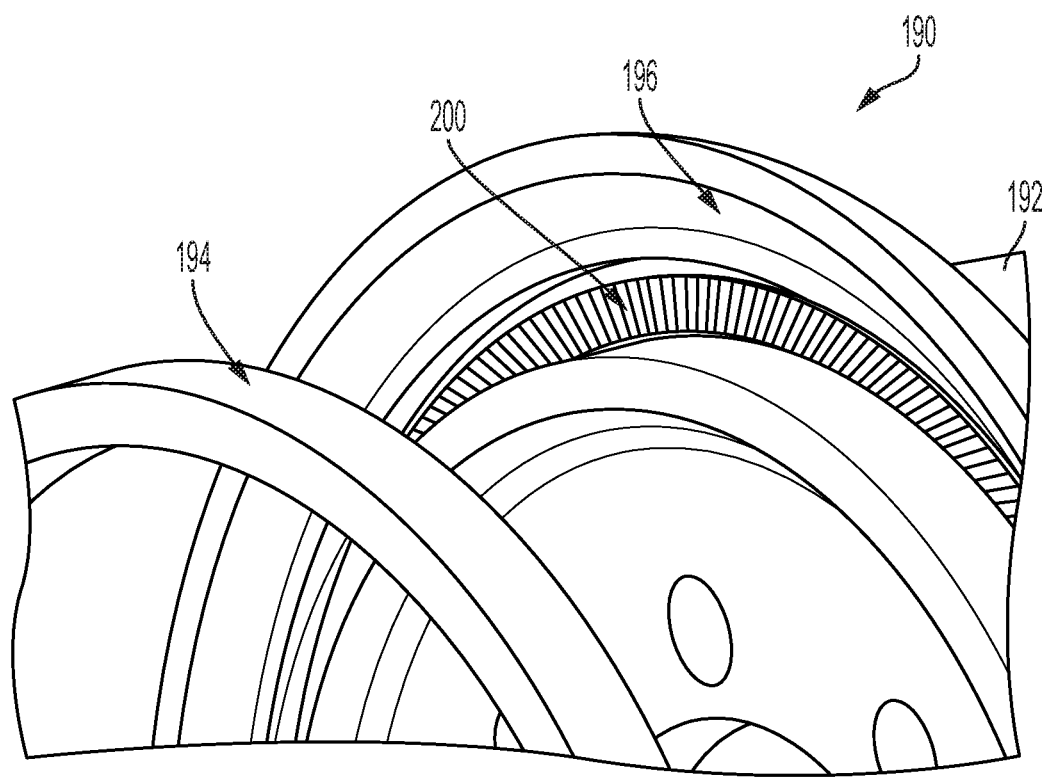
FIG. 13 is a perspective view of a wheel rim according to one example of the present disclosure.
Figure 14:
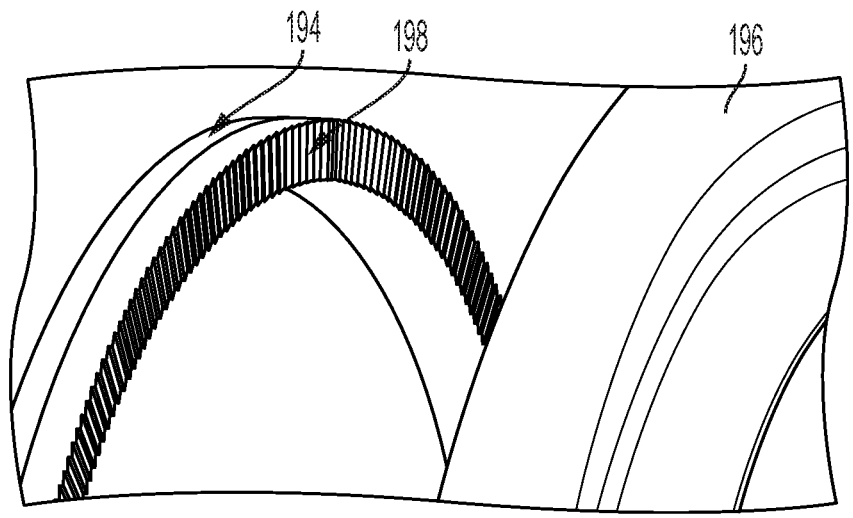
FIG. 14 is another perspective view of the wheel rim of FIG. 13.
Figure 15:
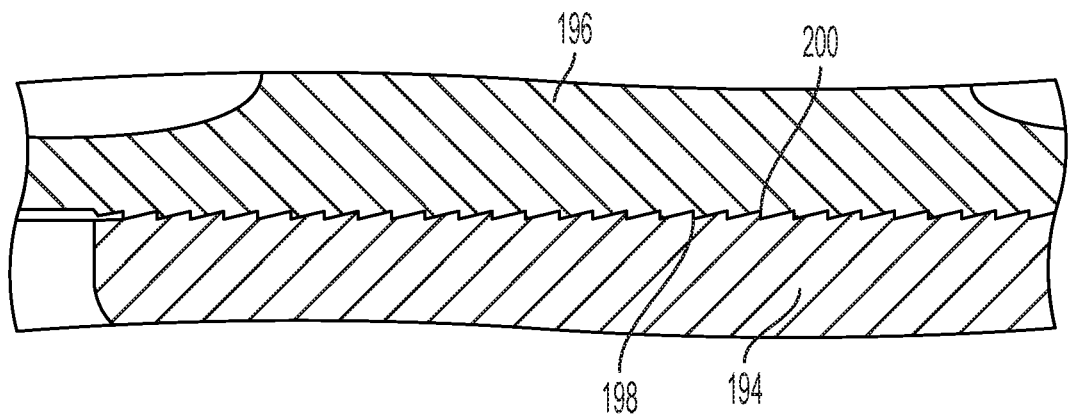
FIG. 15 is a cross-sectional view of the wheel rim of FIG. 13.

With reference to FIGS. 13-15, another example of a wheel rim 190 according to the present disclosure is shown and described. The wheel rim 190 may include an inner rim 192, an outer rim 194, and a wheel flange 196. The inner rim 192 and the outer rim 194a, 194b may be threadedly connected to one another as described above. As shown in FIG. 14, the outer rim 194 may include a plurality of ramps 198 formed on an inner surface of the outer rim 194. As shown in FIG. 13, the wheel flange 196 may include a corresponding plurality of ramps 200 formed on an outer surface of the wheel flange 196. In one example of the present disclosure, the angle of the ramps 198, 200 may be greater than a pitch of the threads provided on the threaded portion of the outer rim 194a, 194b to prevent rotation of the outer rim 194 relative to the inner rim 192 after assembly of the wheel rim 190. Therefore, in the event the outer rim 194 begins to rotate relative to the inner rim 192, the ramps 198, 200 will move against one another and will eventually cause the outer rim 194 and the wheel flange 196 to separate from one another. As the outer rim 194 and the wheel flange 196 separate from one another, the threaded portion of the outer rim 194 will move outwardly creating an interference fit with the threaded portion of the inner rim 192 to prevent further rotation of the outer rim 194 relative to the inner rim 192.

Figure 16:
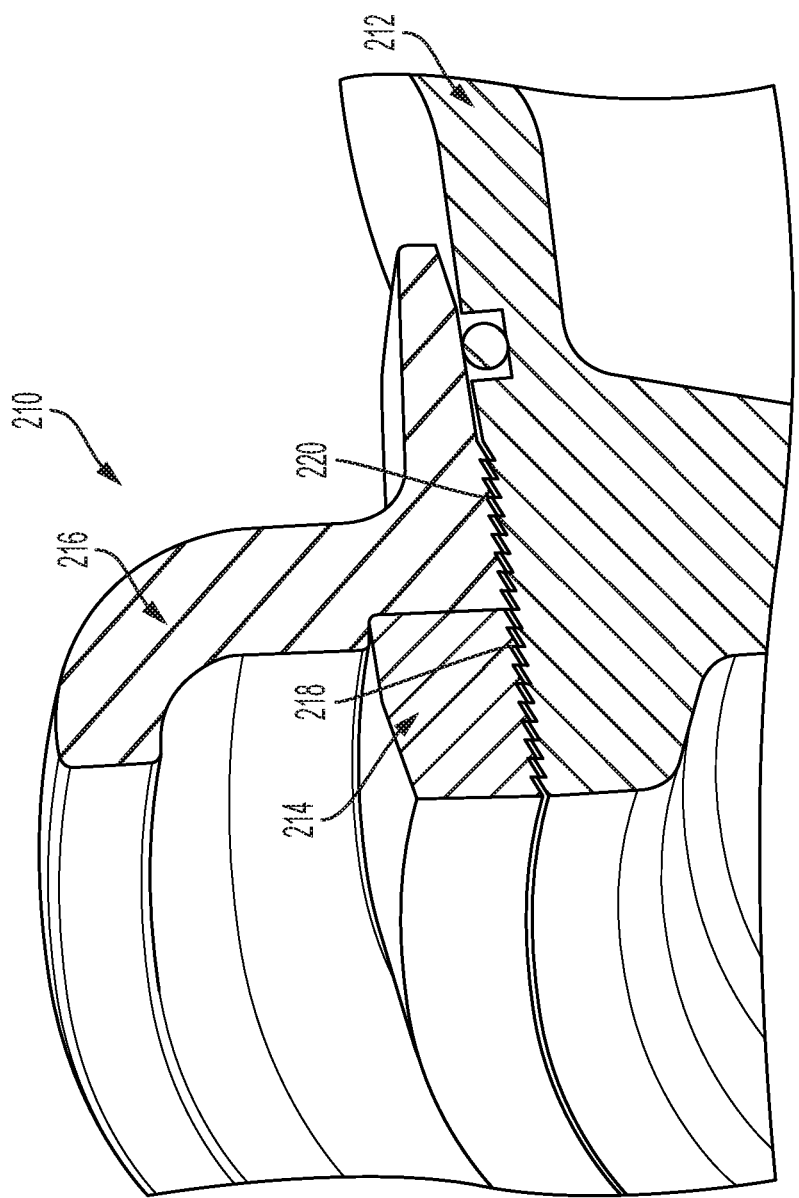
FIG. 16 is a cross-sectional view of a wheel rim according to one example of the present disclosure.

With reference to FIG. 16, another example of a wheel rim 210 according to the present disclosure is shown and described. The wheel rim 210 may include an inner rim 212, an outer rim 214, and a wheel flange 216. The inner rim 212 and the outer rim 214 may be threadedly connected to one another as described above. In this example of the wheel rim 210, the outer rim 214 includes a threaded portion 218 for threadedly connecting to the inner rim 212 and the wheel flange 216 includes a threaded portion 220 for threadedly connecting to the inner rim 212. In one example, the threaded portion 218 of the outer rim 214 may have a different pitch than the threaded portion 220 of the wheel flange 216. In another example, the threaded portion 218 of the outer rim 214 may have a thread direction that is different than a thread direction of the threaded portion 220 of the wheel flange 216. By using this configuration in which the threaded portion 218 of the outer rim 214 has either a different pitch or direction than the threaded portion 220 of the wheel flange 216, the outer rim 214 and the wheel flange 216 are secured to the inner rim 212 and may only be removed from the inner rim 212 when desired by the operator. For example, since the threaded portion 218 of the outer rim 214 may have a different pitch or thread direction than the threaded portion 220 of the wheel flange 216, the two components will jam against one another in the event either the outer rim 214 or the wheel flange 216 or the outer rim 214 and the wheel flange 216 rotate relative to the adjacent component.

Figure 17:
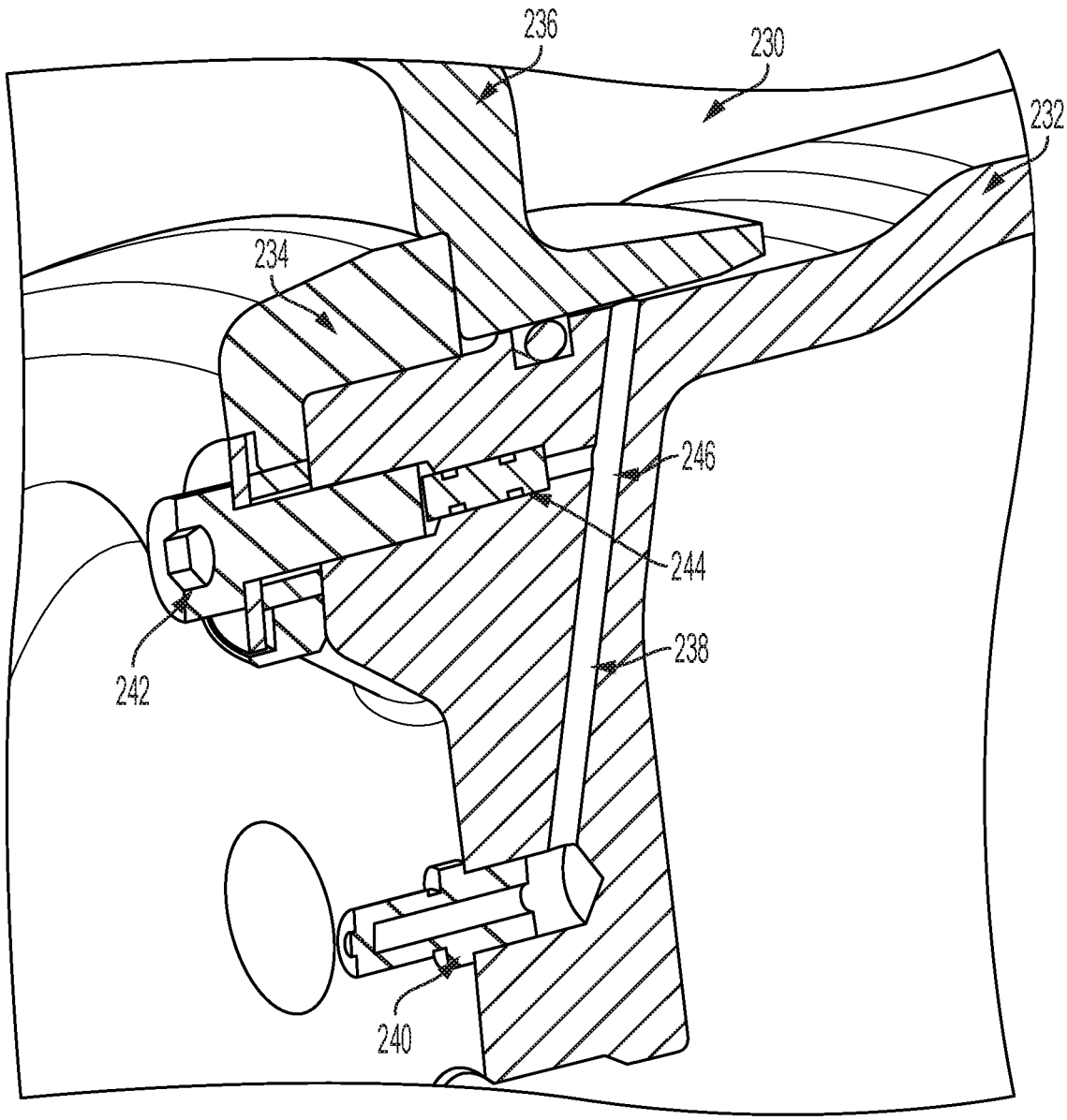
FIG. 17 is a cross-sectional view of a wheel rim according to one example of the present disclosure.

With reference to FIG. 17, another example of a wheel rim 230 according to the present disclosure is shown and described. The wheel rim 230 may include an inner rim 232, an outer rim 234, and a wheel flange 236. The inner rim 232 and the outer rim 234 may be threadedly connected to one another as described above. In this example of the wheel rim 230, a deflation safety arrangement is integrated into the wheel rim 230. As shown in FIG. 17, a valve airway passage 238 may be defined in a portion of the inner rim 232. The valve airway passage 238 is configured to supply pressurized fluid from a fill valve 240 held in the inner rim 232 to a run-flat or tire positioned on the wheel rim 230. The fill valve 240 may be removably held in or integrally formed with the inner rim 232. In this example of the wheel rim 230, at least one anti-rotation fastener 242 may be provided in the outer rim 234 and the inner rim 232 to prevent the outer rim 234 from rotating relative to the inner rim 232. The anti-rotation fastener 242 is also configured to hold a scaling plug 244 within a deflation safety airway passage 246 also defined in the inner rim 232. In one example, the deflation safety airway passage 246 is in fluid communication with the valve airway passage 238. Upon removal of the anti-rotation fastener 242 from the outer rim 234, the sealing plug 244 is permitted to loosen, thereby allowing the air pressure in the run-flat or tire on the wheel rim 230 to escape through the deflation safety airway passage 246. Upon removing the anti-rotation fastener 242, the air pressure in the run-flat or tire on the wheel rim 230 would force the scaling plug 244 out of the wheel rim 230 to permit the air pressure to escape from the deflation safety airway passage 246.

While several aspects of the wheel rim are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A wheel rim for a vehicle, comprising:
   a first rim portion comprising a first wheel flange;
   a second rim portion threadedly connected to the first rim portion; and
   a second wheel flange held on the first rim portion,
   wherein the first rim portion and the second rim portion are also fastened to one another by at least one fastener when assembled, and
   wherein the first rim portion, the second rim portion, and the second wheel flange are separate components.

2. The wheel rim of claim 1, wherein the first rim portion includes a threaded portion on an outer surface of the first rim portion, and the second rim portion includes a threaded portion on an inner surface of the second rim.

3. The wheel rim of claim 1, wherein the first rim portion and the second rim portion are operatively connected to one another only by the threaded connection.

4. The wheel rim of claim 1, wherein the second wheel flange is held on the first rim portion by a sliding fit.

5. The wheel rim of claim 1, wherein the first rim portion and the second rim portion each define a plurality of apertures configured to receive fasteners.

6. The wheel rim of claim 5, further comprising a plurality of fasteners inserted in the plurality of apertures defined in the first rim portion and the second rim portion, wherein the fasteners assist in preventing rotation of the second rim portion relative to the first rim portion.

7. The wheel rim of claim 1, further comprising a sealing element provided on the first rim portion to create a seal between the first rim portion and the second wheel flange.

8. The wheel rim of claim 1, wherein the second wheel flange is held on the first rim portion between the first wheel flange and the threaded connection between the first rim portion and the second rim portion.

9. The wheel rim of claim 1, wherein the second rim portion comprises a stop to limit rotation of the second rim portion relative to the first rim portion.

10. The wheel rim of claim 1, further comprising at least one fastening member that is inserted through the second rim portion to contact an outer surface of the second wheel flange.

11. The wheel rim of claim 1, further comprising an installation tool positioned within the first rim portion,
wherein a first gear arrangement is defined on the second rim portion,
wherein a second gear arrangement is defined on the installation tool, and
wherein rotation of the installation tool causes the second gear arrangement to move the first gear arrangement to assist in rotating the second rim portion relative to the first rim portion.

12. The wheel rim of claim 1, further comprising a key member that is removably inserted into a corresponding key opening defined in the first and second rim portions.

13. A wheel rim assembly, comprising:
a pneumatic tire; and
a wheel rim, comprising:
a first rim portion comprising a first wheel flange;
a second rim portion threadedly connected to the first rim portion; and
a second wheel flange held on the first rim portion,
wherein the first rim portion and the second rim portion are also fastened to one another by at least one fastener when assembled, and
wherein the first rim portion, the second rim portion, and the second wheel flange are separate components.

14. The wheel rim assembly of claim 13, wherein the first rim portion includes a threaded portion on an outer surface of the first rim portion, and the second rim portion includes a threaded portion on an inner surface of the second rim portion.

15. The wheel rim assembly of claim 13, wherein the first rim portion and the second rim portion are operatively connected to one another only by the threaded connection.

16. The wheel rim assembly of claim 13, wherein the second wheel flange is held on the first rim portion by a sliding fit.

17. The wheel rim assembly of claim 13, wherein the first rim portion and the second rim portion each define a plurality of apertures configured to receive fasteners.

18. The wheel rim assembly of claim 17, further comprising a plurality of fasteners inserted in the plurality of apertures defined in the first rim portion and the second rim portion, wherein the fasteners assist in preventing rotation of the second rim portion relative to the first rim portion.

19. The wheel rim assembly of claim 13, further comprising a sealing element provided on the first rim portion to create a seal between the first rim portion and the second wheel flange.

20. The wheel rim assembly of claim 13, wherein the second wheel flange is held on the first rim portion between the first wheel flange and the threaded connection between the first rim portion and the second rim portion.

21. The wheel rim assembly of claim 13, wherein the second rim portion comprises a stop to limit rotation of the second rim portion relative to the first rim portion.

22. The wheel rim assembly of claim 13, further comprising at least one fastening member that is inserted through the second rim portion to contact an outer surface of the second wheel flange.

23. The wheel rim assembly of claim 13, further comprising an installation tool positioned within the first rim portion,
wherein a first gear arrangement is defined on the second rim portion,
wherein a second gear arrangement is defined on the installation tool, and
wherein rotation of the installation tool causes the second gear arrangement to move the first gear arrangement to assist in rotating the second rim portion relative to the first rim portion.

24. The wheel rim assembly of claim 13, further comprising a key member that is removably inserted into a corresponding key opening defined in the first and second rim portions.

25. A method of assembling a wheel rim assembly, comprising:
providing a first rim portion comprising a first wheel flange;
sliding a second wheel flange onto the first rim portion;
operatively connecting a second rim portion onto the first rim portion by a threaded connection; and
fastening the first rim portion to the second rim portion using at least one fastener,
wherein the first rim portion, the second rim portion, and the second wheel flange are separate components.

26. The method of claim 25, further comprising inserting additional fasteners into the first rim portion through the second rim portion to prevent rotation of the second rim portion relative to the first rim portion.

* * * * *